United States Patent
Kathawala et al.

(10) Patent No.: US 12,511,193 B1
(45) Date of Patent: Dec. 30, 2025

(54) METHODS AND SYSTEMS FOR SLC COPYBACK OPERATIONS

(71) Applicants: SK Hynix NAND Product Solutions Corp., Rancho Cordova, CA (US); SK hynix Inc., Icheon-si (KR)

(72) Inventors: Gulzar Kathawala, Fremont, CA (US); Ming Zhang, San Jose, CA (US); Yogesh Wakchaure, Folsom, CA (US); Jonathan de Vries, Folsom, CA (US); David Carlton, Pleasanton, CA (US); Yushin Ahn, Seoul (KR); Taehun Park, Seoul (KR); Wanik Cho, Seoul (KR)

(73) Assignees: SK Hynix NAND Product Solutions Corp., Rancho Cordova, CA (US); SK hynix Inc., Icheon-si (KR)

( * ) Notice: Subject to any disclaimer, the term of this patent is extended or adjusted under 35 U.S.C. 154(b) by 0 days.

(21) Appl. No.: 18/761,045

(22) Filed: Jul. 1, 2024

(51) Int. Cl.
G06F 11/10 (2006.01)

(52) U.S. Cl.
CPC ...... G06F 11/1068 (2013.01); G06F 11/1004 (2013.01)

(58) Field of Classification Search
None
See application file for complete search history.

(56) References Cited

U.S. PATENT DOCUMENTS

| | | |
|---|---|---|
| 11,288,160 B2 | 3/2022 | McNeil, Jr. et al. |
| 2012/0240012 A1* | 9/2012 | Weathers ............... G11C 29/52 714/E11.034 |
| 2012/0246391 A1 | 9/2012 | Meir et al. |
| 2015/0012684 A1* | 1/2015 | Avila .................... G06F 3/0688 711/103 |
| 2015/0012802 A1* | 1/2015 | Avila ................ G11C 16/3418 714/773 |
| 2018/0189135 A1 | 7/2018 | Naik et al. |
| 2021/0048952 A1* | 2/2021 | Cariello ................ G06F 3/0679 |
| 2021/0303203 A1* | 9/2021 | Eliash .................... G06F 3/068 |
| 2022/0129168 A1* | 4/2022 | Tanpairoj ............ G06F 12/0246 |

(Continued)

OTHER PUBLICATIONS

S. Hong and D. Shin, "NAND Flash-Based Disk Cache Using SLC/MLC Combined Flash Memory," 2010 International Workshop on Storage Network Architecture and Parallel I/Os, Incline Village, NV, USA, 2010, pp. 21-30, (Year: 2010).*

*Primary Examiner* — Daniel F. McMahon
(74) *Attorney, Agent, or Firm* — Haley Guiliano LLP

(57) ABSTRACT

In accordance with some embodiments of the present disclosure, a method is performed by processing circuitry of a storage device for writing data to memory of a storage device. The method is related to executing a program to write data written in a plurality of single-layer cells (SLCs) in a first portion of the memory to a plurality of multi-level cells (MLCs) in a second portion of the memory using a single program command. The single program command includes an address of each SLC in the first portion of the memory and optionally, additional information regarding SLC read-level shifts. Executing the single program command includes reading from each SLC of the plurality of SLCs, storing at least some of the respective SLC data in the plurality of latches, and writing the SLC data that was stored in the plurality of latches to the plurality of MLCs.

20 Claims, 7 Drawing Sheets

(56) References Cited

U.S. PATENT DOCUMENTS

| | | | |
|---|---|---|---|
| 2022/0139466 A1* | 5/2022 | Gorobets | G11C 11/5628 365/189.011 |
| 2023/0395107 A1 | 12/2023 | Madraswala et al. | |
| 2024/0071509 A1* | 2/2024 | Yang | G11C 16/3459 |

* cited by examiner

METHODS AND SYSTEMS FOR SLC COPYBACK OPERATIONS

TECHNICAL FIELD

The present disclosure is directed to methods and systems for single-layer cell (SLC) copyback operations (e.g., internal and/or external copyback operations).

SUMMARY

In accordance with the present disclosure, methods and systems are provided for single-layer cell (SLC) copyback operations (e.g., internal and/or external copyback operations). The methods and systems disclosed herein may improve the speed and/or efficiency of multi-pass programming that is used to program multi-layer cells (MLCs) in memory devices.

In accordance with some embodiments of the present disclosure, a method for writing data to a storage device is performed by processing circuitry (e.g., a memory controller) of the storage device. The method includes receiving, at the processing circuitry, an instruction from a host device to write the data to the storage device and, based on the receiving the instruction, writing the data to a plurality of SLCs, wherein each SLC is located in a first portion of the memory, and executing, and using the processing circuitry, a program to write the data written in the plurality of SLCs to a plurality of MLCs using a single program command including an address of each SLC in the first portion of the memory. Each MLC is located at a second portion of the memory, and executing the program includes reading, from each SLC of the plurality of SLCs in the first portion of the memory, respective SLC data, storing, in each of a plurality of latches, at least some of the respective single-layer cell (SLC) data that was read from the plurality of SLCs in the first portion of the memory, writing the SLC data that was stored in the plurality of latches to the plurality of MLCs in the second portion of the memory, and configuring the second portion of the memory by determining threshold voltage distributions associated with respective threshold voltages of the MLCs. The threshold voltage distributions may be used to read respective data written in each MLC.

In some embodiments, the single program command also includes at least one of a program erase count or a read level shift.

In some embodiments, reading from each SLC of the plurality of SLCs also includes reading from each SLC of the plurality of SLCs based on the at least one of a program erase count or a read level shift.

In some embodiments, configuring the second portion of the memory also includes determining the threshold voltage distributions using multiple passes.

In some embodiments, on each pass of the multiple passes, one or more of the threshold voltage distributions is made narrower.

In some embodiments, writing the SLC data that was stored in the plurality of latches to the plurality of MLCs in the second portion of the memory also includes performing an error detection based on a low-density parity check. In some embodiments, writing the SLC data that was stored in the plurality of latches to the plurality of MLCs in the second portion of the memory further includes performing an error correction based on the error detection.

In some embodiments, before reading from each SLC of the plurality of SLCs, the data is written to memory of a memory controller, where the memory of the memory controller is separate from the memory of the storage device.

In some embodiments, the data written to the memory of the memory controller is sent to the plurality of latches.

In accordance with some embodiments of the present disclosure, a memory storage device includes memory and processing circuitry (e.g., a memory controller) coupled to the memory, and the processing circuitry is configured to receive an instruction from a host device (which may, in some embodiments, be a memory controller) to write data to the memory storage device and, based on the receiving the instruction, to cause the data to be written in a plurality of SLCs, where each SLC of the plurality of SLCs is located in a first portion of the memory, and execute a program to write the data written to the plurality of SLCs to a plurality of MLCs using a single program command including an address of each SLC in the first portion of the memory, where each MLC is located at a second portion of the memory. Executing the program includes causing respective SLC data to be read from each SLC of the plurality of SLCs in the first portion of the memory, causing at least some of the respective SLC data that was read from the plurality of SLCs to be stored in each of a plurality of latches, writing the SLC data that was stored in the plurality of latches to the plurality of MLCs in the second portion of the memory, and configuring the second portion of the memory by determining threshold voltage distributions associated with respective threshold voltages of the MLCs. Respective data written in each MLC may be read using the threshold voltage distributions.

In some embodiments, the single program command also includes at least one of a program erase count, a read level shift or other meta information such as temperature.

In some embodiments, the processing circuitry is also to read from each SLC of the plurality of SLCs based on the at least one of a program erase count or a read level shift.

In some embodiments, the processing circuitry is also to use the threshold voltage distributions to read respective data stored in each MLC.

In some embodiments, the processing circuitry is also to configure the second portion of the memory by determining the threshold voltage distributions using multiple passes.

In some embodiments, the processing circuitry is also to configure the threshold voltage distributions such that on each pass of the multiple passes, one or more of the threshold voltage distributions is made narrower.

In some embodiments, the processing circuitry is also to perform an error detection based on a low-density parity check when writing the SLC data that was stored in the plurality of latches to the plurality of MLCs in the second portion of the memory. In some embodiments, the processing circuitry is further to perform an error correction based on the error detection when writing the SLC data that was stored in the plurality of latches to the plurality of MLCs in the second portion of the memory.

In some embodiments, the processing circuitry is also to write the data to memory of a memory controller, where the memory of the memory controller is separate from the memory of the storage device, and to send the data from the memory of the memory controller to the plurality of latches.

In accordance with some embodiments of the present disclosure, a method is performed by processing circuitry (e.g., a memory controller) of a storage device for writing data to the storage device. The method includes receiving, at processing circuitry, an instruction from a host device to write the data to the storage device and, based on the receiving the instruction, writing the data to a plurality of SLCs, where each SLC is located in a first portion of the memory, reading from each SLC of the plurality of SLCs in the first portion of the memory respective SLC data, storing, in each of a plurality of latches, at least some of the respective SLC data that was read from the plurality of SLCs in the first portion of the memory, and executing, using the processing circuitry, a program to write the SLC data stored in the plurality of latches to a plurality of MLCs using a single program command including an address of each SLC in the first portion of the memory, where each MLC is located at a second portion of the memory. Executing the program includes writing the SLC data that was stored in the plurality of latches to the plurality of MLCs in the second portion of the memory, and configuring the second portion of the memory by determining threshold voltage distributions associated with respective threshold voltages of the MLCs. The threshold voltage distributions may be used to read respective data written in each MLC.

In some embodiments, the writing of the SLC data that was stored in the plurality of latches to the plurality of MLCs in the second portion of the memory also includes performing an error detection based on a low-density parity check. In some embodiments, the writing of the SLC data that was stored in the plurality of latches to the plurality of MLCs in the second portion of the memory further includes performing an error correction based on the error detection.

In some embodiments, before the reading from each SLC of the plurality of SLCs, the data is also written to memory of a memory controller, where the memory of the memory controller is separate from the memory of the storage device.

In some embodiments, the data written to the memory of the memory controller is also sent to the plurality of latches.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in some embodiments" appearing herein describe various embodiments and implementations, and do not necessarily all refer to the same one or more embodiment. However, they are also not necessarily mutually exclusive.

DETAILED DESCRIPTION

Figure 1:
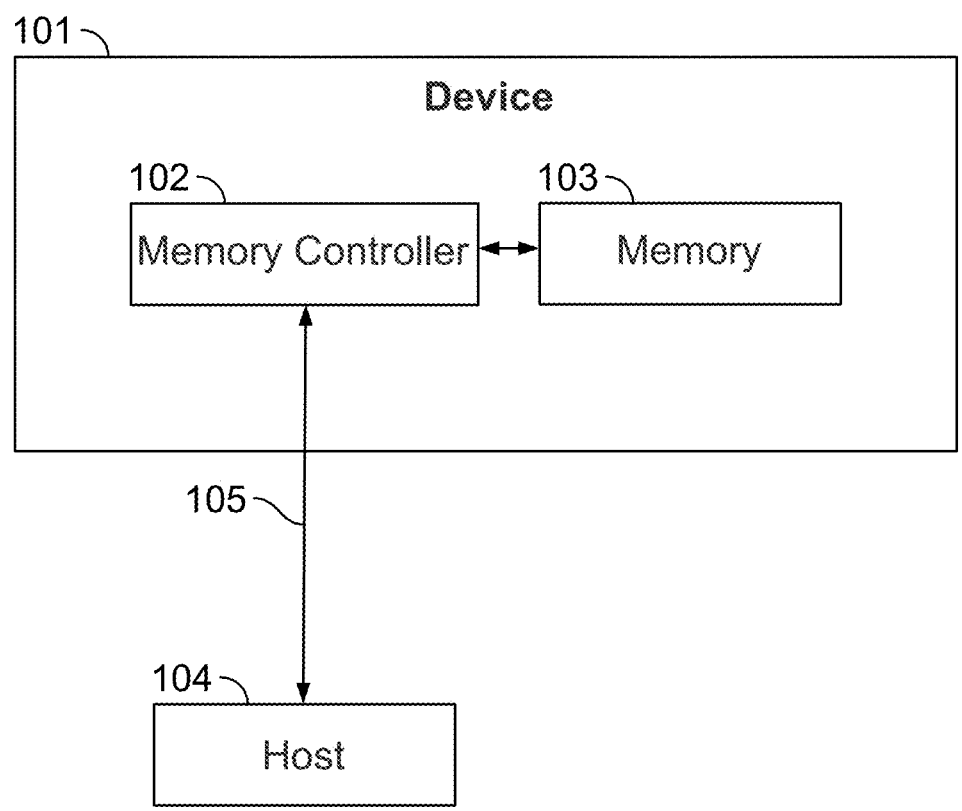
FIG. 1 shows a system including a storage device and a host, in accordance with some embodiments of the present disclosure.

In accordance with the present disclosure, systems and methods are provided for optimizing internal and external single-layer cell (SLC) copyback operations as are executed for the programming of multi-level cells (MLCs) in memory/storage devices (e.g., SSDs). As used herein, an MLC may refer to any memory cell that holds more than one bit of data (e.g., a three-level cell (TLC), quad-level cell (QLC), five-level cell (PLC), or more). This feature of storing multiple bits distinguishes an MLC from a SLC, which can store only one bit per memory cell.

MLCs may offer advantages over SLCs when used in memory/storage devices (e.g., SSDs) because they can store more data in the same number of cells. Thus, when using MLCs instead of SLCs, a smaller array can be used to store the same total memory capacity of the storage device, or the total memory capacity of the storage device may be increased using a similarly-sized array. However, use of MLCs may be associated with a functional tradeoff due to MLCs typically having higher operational complexity, lower performance, and lower endurance than SLCs. For example, programming MLCs (e.g., configuring the MLCs to store data that can subsequently be read) typically requires a multi-pass programming scheme (e.g., foggy/fine programming), during which data may be entirely or partially unreadable after the first pass, and therefore the data needs to be sent multiple times from the controller to the memory to make the MLCs entirely (or almost entirely) readable. Thus, performance of the storage device is degraded due to the additional power and channel use incurred during such multi-pass programming. To address this issue, storage devices using MLCs may perform SLC caching (e.g., SLC copyback operations) or other power-protected caching schemes for persisting data across power cycles.

When a storage system uses SLC copyback reads (e.g., internal or external) for MLC writes, it compromises system performance due to performing reliability checks (e.g., error detection, error correction) and read optimization (e.g., read-level shift, program-erase cycle count). Additionally, multiple read commands may be involved prior to transferring data to the MLC program latches and executing the final the MLC program command, which further degrades performance.

In an internal SLC copyback scheme, when SLCs are used for caching, the incoming host data may be initially written to SLC blocks, after which the same data may be read and written to the MLC blocks (i.e., internal SLC copyback operation). In such a scheme, the data that is read from SLC cells may not be (e.g., for efficiency) inspected for error bits or corrected, such as by using error correction codes (ECCs), and this process ultimately may write the errors into the MLC addresses, introducing possible reliability issues to internal SLC copyback operations. After these operations are completed, the SLC data are read page-wise (e.g., by, or in response to a command from, the memory controller) and additional latch data transfer commands are required to place the data in the correct MLC program latches before programming the MLCs. This process of page-wise SLC reads with latch data transfer commands is repeated for each pass, requiring more power usage and resulting in less efficiency.

An external SLC copyback scheme is similar to an internal SLC copyback scheme, except that the data is error corrected before being written to the MLCs. For example, the SLC data is read out to the controller, error corrected using ECCs (e.g., low density parity check (LDPC)), and sent back to the memory (e.g., NAND, NOR) for MLC programming. In such an external copyback approach, data is always (or nearly always) error-free at the point of MLC programming, but there is additional performance loss compared to an internal copyback operation due to more steps needed, such as causing external data transfers to and from the controller and causing additional processing time for error detection or correction.

In accordance with some embodiments of the present disclosure, processing circuitry of a memory device provides one or more multi-phase program commands during internal and/or external SLC copyback operations. Each of these multi-phase program commands can cause all the SLC page reads, internal memory data latch transfers, and MLC programming to occur in response to one single atomic command. In some embodiments, the multi-phase program commands additionally cause SLC reliability checks (e.g., LDPC error correction or advanced NAND algorithms) and/or SLC memory read-level calibration to occur. As used herein, a command may be multi-phase because it causes SLC data to be read and transferred to corresponding MLC program latches. A multi-phase command may, but does not have to, also cause these MLCs to be programmed (e.g., foggy/fine programming).

The SLC page addresses to read can be established (e.g., in a preset manner) by using set feature or set trim commands within the single atomic command. The addresses of all SLC pages can be preset separately, or in a simpler approach, the initial page address per plane can be set with the constraint that the other pages will be set as incremental page addresses based on respective prior pages. In some embodiments, SLC read levels can be shifted proactively (e.g., based on a program erase count, a read level shift or other meta information such as temperature) to lower the rate of incorrectly reading SLC bits. By using multi-phase commands, the number of commands needed to execute an internal SLC copyback scheme plus a MLC (e.g., a TLC/QLC/PLC) write can be reduced from as many as 15 or more commands to a single command, improving NAND utilization (e.g., by reducing the time that the memory stays in idle mode and supporting broader use of the NAND memory), reducing the need for additional status check and simplifying firmware complexity.

In some embodiments, in response to receiving the single multi-phase program command, the controller reads SLC data from predetermined addresses and stores the read data in MLC program latches for all data pages that are to be programmed. Optionally, calibration information (e.g., read level shift, program-erase cycles) associated with the SLC read level can be used during the execution of this single command to improve reliability of the MLC data.

In some embodiments, data can be saved in the MLC program latches during the programming of the SLCs and this data can be used directly to program MLCs, removing the need for SLC reads at least during the first pass of multi-pass MLC programming.

In some embodiments, data can be saved in the memory (e.g., DRAM) of the memory controller during the programming of the SLCs, and this clean (e.g., error-free, or having less than a threshold number of errors) data can be sent during subsequent passes (e.g., second pass) of multi-pass MLC programming. This technique avoids the need for error correction based on error corrections codes (e.g., LDPC ECCs) and improves the reliability of the MLC data.

The subject matter of this disclosure is further discussed with reference to FIGS. 1-7.

FIG. 1 shows a system that includes a storage device 101 that is communicatively coupled to a host 104 (e.g., a host device), in accordance with some embodiments of the present disclosure. Storage device 101 includes a memory controller 102 and memory 103. Memory 103 includes the cell array that stores the non-volatile memory (e.g., NAND or NOR). In some embodiments, the memory controller 102 may include a memory (e.g., DRAM) that is separate from the memory 103 (e.g., NAND or NOR) of the storage device 101 and that may be referred to as memory of the memory controller. Logical rules and protocols for operating storage device 101 and host 104 may be established by certain operational specifications (e.g., NVMe, PCIe, SATA, any other suitable transport protocol specifications, or any combination thereof).

Host 104 (e.g., processing circuitry of host 104) is configured to send read, write, and erase commands to storage device 101. Memory controller 102 is configured to receive, interpret, and act on the read, write, and erase commands sent by the host 104. Memory controller 102 is further configured to execute these commands on memory 103 such that an updated state of memory 103 reflects the outcomes of the command-based data operations. In some embodiments, such data operations are executed as part of internal copyback operations. In some embodiments, such data operations are executed as part of external copyback operations. An operation (e.g., read, write, or erase) may be performed in response to one or more commands 105 (e.g., where the commands are to perform the operation). In some embodiments, commands 105 may also include additional information for the single-layer cell (SLC) reads (e.g., page location, program-erase count, and/or read level shift). In some embodiments, a single command 105 may be issued for a multi-phase programming of a multi-level cell (MLC) during an SLC copyback operation. As used herein, multi-phase programming may refer to a multi-pass scheme where a first pass of programming sets the threshold voltage distribution of MLC cells at their target values, but with relatively wide gaussian distributions (e.g., as a first foggy/rough programming operation), and subsequent passes narrow these relatively wide distributions to improve the accuracy of reading from the MLCs using the respective threshold voltages (e.g., where the subsequent passes are fine programming operations).

In some embodiments, storage device 101 is an SSD device. An SSD device is a data storage device that uses multiple semiconductor cells (e.g., SLCs and/or MLCs) arranged in an array to persistently store data. SSDs have no moving components, distinguishing SSDs from traditional electromechanical magnetic disks, such as hard disk drives (HDDs) or floppy disks, which contain spinning disks and movable read/write heads. Compared to electromechanical disks, SSDs are typically more resistant to physical shock, run silently, have lower access time, and have less latency. SSDs use indirect memory addressing, which stores data into a next available physical memory address and maps the next available physical memory address to the logical memory address within an indirection table. In some embodiments, the semiconductor cell array of the SSD uses a NAND flash (e.g., 3D NAND) architecture. In some embodiments, the SSD device can be single-plane or multi-plane (i.e., 2 or more planes). Multi-plane SSD devices allow for parallel operations to occur across different planes of a single device.

Figure 2:
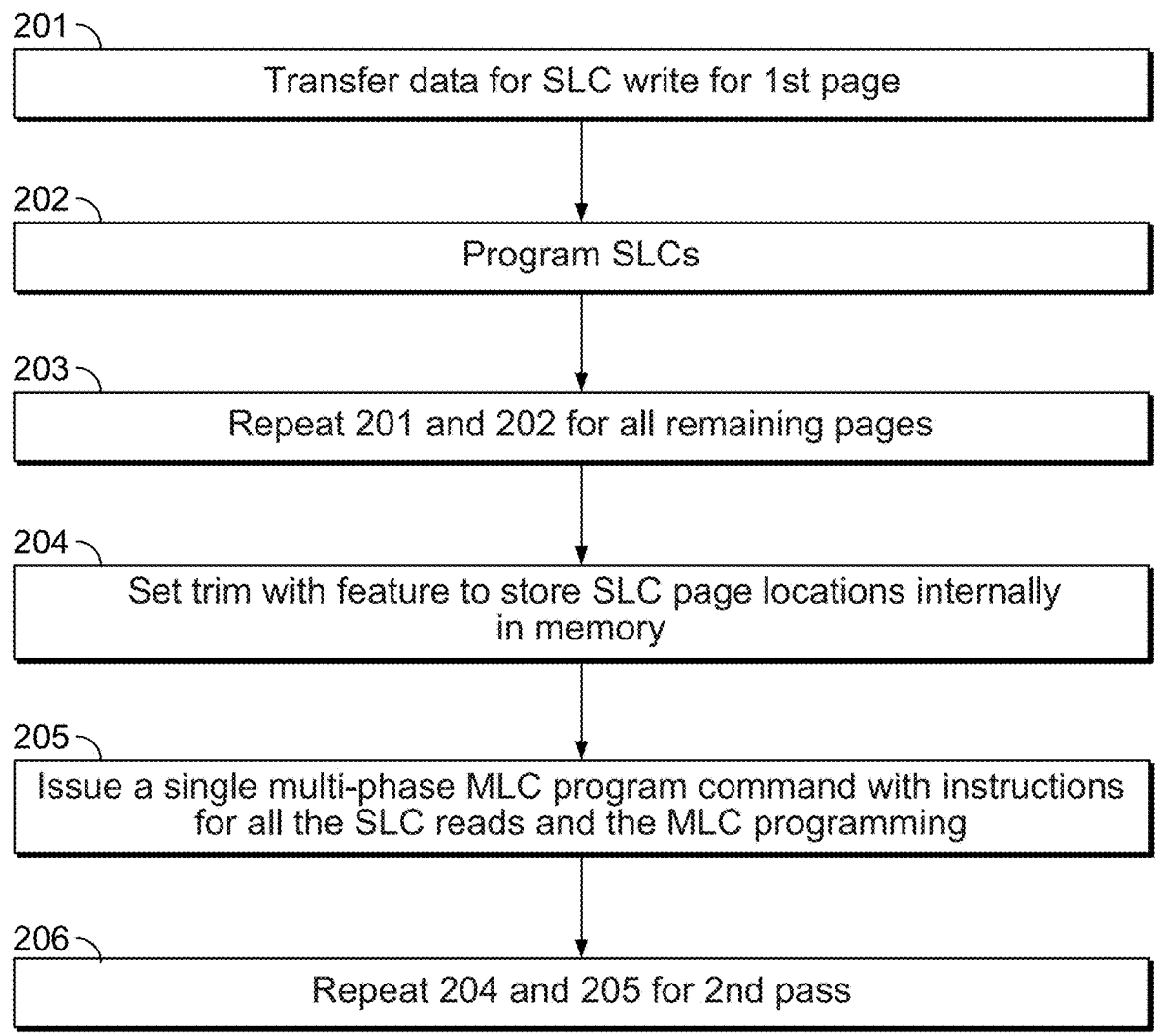
FIG. 2 shows an illustrative flowchart of an internal SLC copyback operation, in accordance with some embodiments of the present disclosure.

FIG. 2 shows an illustrative flowchart of steps of an internal SLC copyback operation, in accordance with some embodiments of the present disclosure. In some embodiments, the host 104 performs a writing operation at the storage device 101. At step 201, the host 104 transfers data to memory 103 by sending a command to the memory controller 102 inside the storage device 101. At step 202, the memory controller 102 writes the new data to a first page of SLCs. As may be needed when transferring multiple pages of data, steps 201 and 202 are optionally repeated at step 203 for each of the remaining pages of data. The total number of SLC pages that may be processed during programming of a corresponding MLC can depend on the number of bits per cell of the MLC. For example, considering QLCs that each store 4 bits per cell, 4 pages of SLCs would be required to fully write to a page of QLCs. For a TLC or PLC, the number of required SLC pages may be 3 or 5, respectively, for each page of the TLC or PLC.

At step 204, the controller 102 issues a set trim command including a feature to store page addresses internally in the memory 103. The set trim command is a command issued by controller 102 to NAND memory (or any other suitable memory 103) to assign specific values to at least some registers that reside inside the NAND. In some embodiments, additional information related to the subsequent operations can also be stored internally in the memory 103 as part of the set trim command. For example, the additional information may be the program-erase count, and/or the read level shift, and providing this additional information may improve the accuracy (e.g., more threshold voltage distribution narrowing occurs on a given pass) of the subsequent MLC programming.

At step 205, the controller 102 issues a single multi-phase MLC program command. The single command includes instructions for how to read from the SLCs of all the pages programmed in steps 201-203 (e.g., based on the SLC addresses stored in memory 103), and it includes instructions for the corresponding MLC programming. This command is used at least for the 1st pass of MLC programming (e.g., foggy programming). At step 206, steps 204 and 205 are repeated for a 2nd pass of MLC programming (e.g., fine programming). The 2nd pass improves (e.g., narrows) the threshold voltage distribution of the MLCs and therefore makes subsequent reading of the MLCs more accurate.

Figure 3:
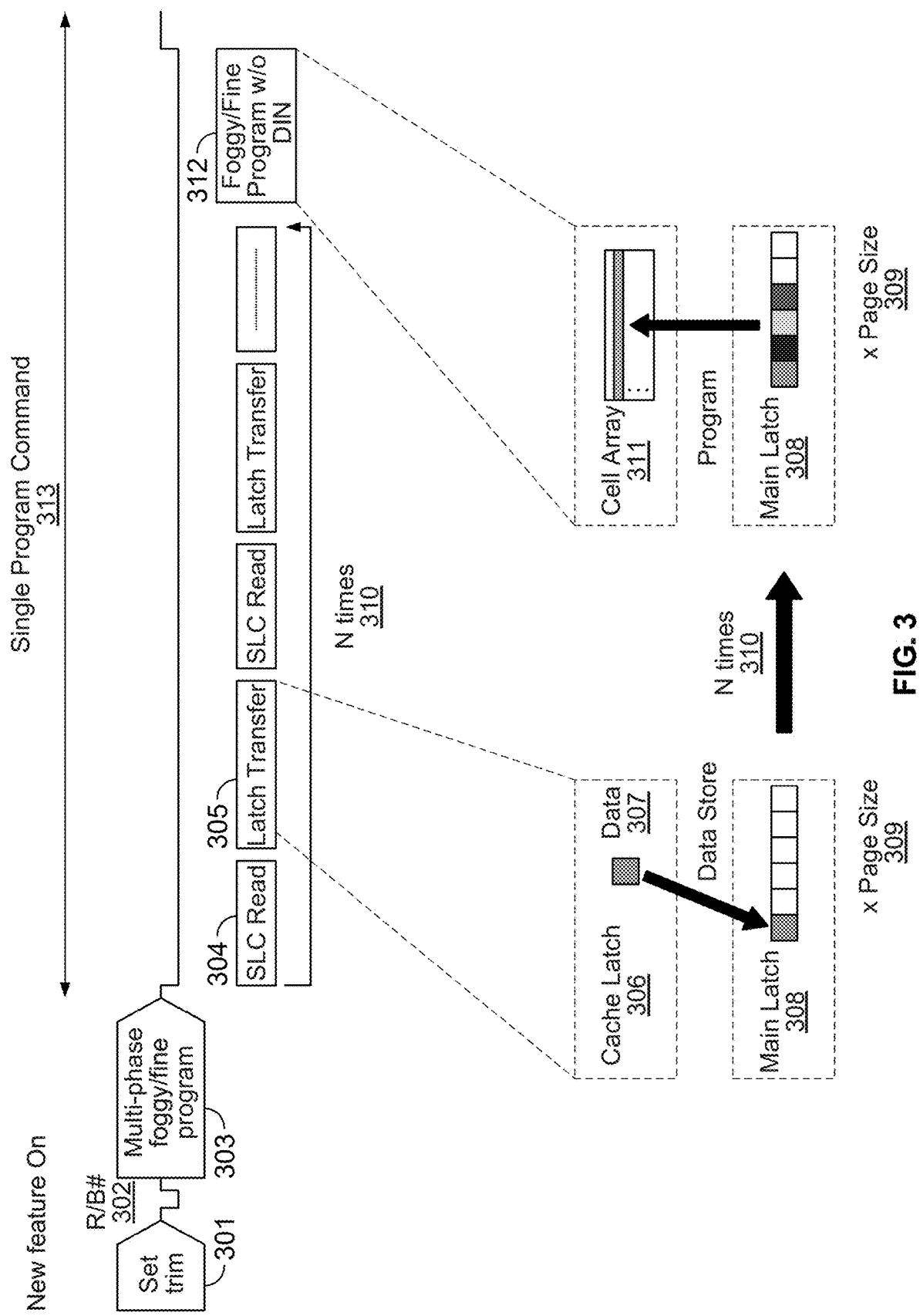
FIG. 3 shows a schematic representation of an internal SLC copyback operation, in accordance with some embodiments of the present disclosure.

FIG. 3 shows a schematic representation of an internal SLC copyback operation, in accordance with some embodiments of the present disclosure. At step 301 the controller 102 sets the memory trim registers for the SLC copyback operation with a feature that stores additional information regarding SLC reads (e.g., SLC page addresses) internally in the memory 103. In some embodiments, step 301 corresponds to step 204 of FIG. 2. In some embodiments, the operation of controller 102 setting the memory trim registers includes internally storing additional information for the subsequent operations in the memory 103. For example, the additional information may be a program-erase count, a read level shift, or other meta information such as temperature. In this approach, SLC read levels can be shifted proactively to reduce the rate of failed SLC reads.

The R/B #output signal 302 is used to indicate the operating condition of the memory 103. In some embodiments, the R/B signal is in a busy state (i.e., R/B #=low) during the program, erase and read operations, and the R/B signal returns to a ready state (i.e., R/B #=high) after completion of the operation. At step 303, the controller 102 issues a single multi-phase MLC program command 313 to the storage device 101. In some embodiments, step 303 corresponds to step 205 of FIG. 2. In some embodiments, the command 313 includes instructions (e.g., including SLC addresses) for how to read from the SLCs included in all the pages holding memory to be stored in the MLCs, instructions for how to transfer the data stored in the SLCs using one or more latches, and instructions for executing the corresponding MLC programming. The command stores data in the MLC cells and executes at least the 1st pass of MLC programming 312 (e.g., foggy programming). A latch is typically a flip-flop that can store 1 bit of data. As part of the operations caused by the command, the memory controller 102 reads a page of the SLCs at step 304 and transfers the corresponding data to latches (e.g., cache latches 306 or main latches 308) at step 305. The controller 102 repeats the page-wise SLC read 304 and latch transfer 305 operations N times 310, where N corresponds to the number of planes in the memory 103. During each latch transfer 305, the memory controller 102 retrieves data 307 from a cache latch 306 and stores the data 307 in a main latch 308. It is noted that each block in cache latch 306 and main latch 308 may represent a page or a multi-plane page of data. The total amount data transferred may be roughly equal to the page size 309 (e.g., 4 kB, 8 kB, or 16 kB) of the memory 103 multiplied by the number of planes N 310 (e.g., 2, 4, or any other suitable number of planes) in the memory 103. The page size 309 and the number of planes N 310 may depend on the technology node, system configuration, any other suitable factor, or any combination thereof. In some embodiments, the controller 102 may operate on each one of the N planes in parallel (e.g., to increase throughput). After the controller 102 repeats the aforementioned steps N times 310 for each of the required pages of SLC, the controller 102 uses the total data from these main latches 308 to program, at step 312, the corresponding number of MLCs in the cell array 311.

In some embodiments, the controller 102 performs a 2nd pass of programming (e.g., fine programming) after the memory controller 102 completes the operations of command 313, where this second pass repeats all the operations of FIG. 3 (including steps 301-313), including the use of the single multi-phase command to perform SLC reads for all pages, respective latch transfers, and respective MLC programming.

Figure 4:
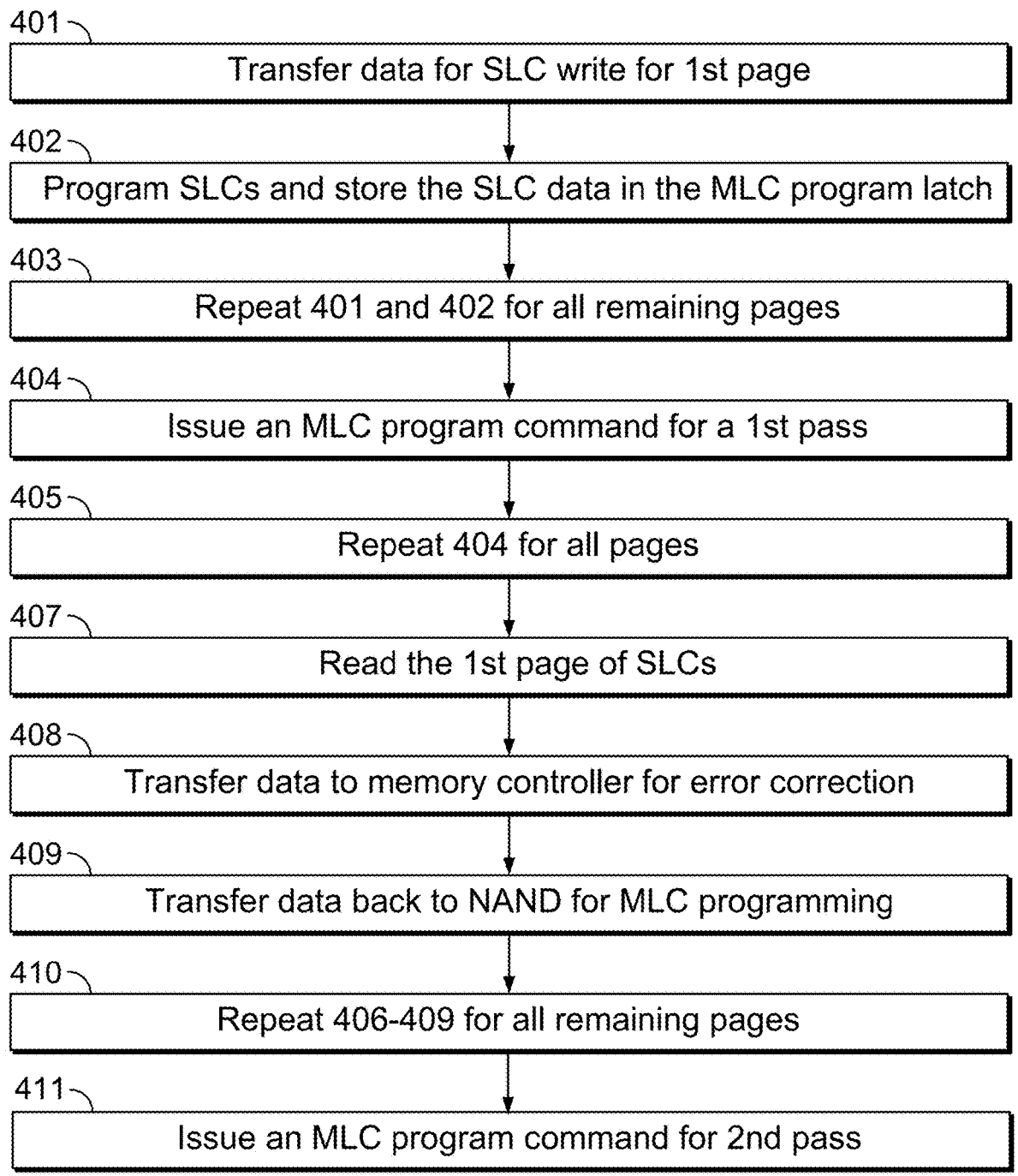
FIG. 4 shows an illustrative flowchart of a first external SLC copyback operation, in accordance with some embodiments of the present disclosure.

FIG. 4 shows an illustrative flowchart of steps of an external SLC copyback operation, in accordance with some embodiments of the present disclosure. In some embodiments, the host 104 performs a write operation at the storage device 101. At step 401, the host 104 transfers data to memory 103 by sending a command to the memory controller 102 inside the storage device 101. At step 402, the memory controller 102 writes the new data to a first page of SLCs and additionally stores data in MLC program latches (e.g., the main latches). As may be needed when transferring multiple pages of data, steps 401 and 402 are optionally repeated at step 403 for each of the remaining pages of data. The total number of SLC pages that may be processed during programming of a corresponding MLC can depend on the number of bits per cell of the MLC.

At step 404, the controller 102 issues an MLC program command for the 1st pass (e.g., foggy programming) with the data stored in the MLC program latches. In some embodiments, the process in step 404 is repeated for all desired data at step 405 before the 2nd pass occurs. For example, the desired data may include a specific number of pages (e.g., the initial page and each of the remaining pages). For another example, the desired data may include an initial page and at least a portion (e.g., one or more wordlines) of a subsequent page.

The controller 102 reads the 1st page of data from the SLCs at step 407 and transfers the data back to the controller for error correction at step 408. For example, error correction codes (ECCs) such as low density parity check (LDPC), Bose-Chaudhuri-Hocquenghem (BCH), or Reed-Solomon (RS) may be used for error correction. At step 409, the controller 102 transfers the error corrected data back to the memory for the 2nd pass of MLC programming. At step 410, steps 407-409 are repeated for all the remaining pages. At step 411 the controller 102 issues an MLC program command for the 2nd pass (e.g., fine programming).

The method of FIG. 4 shows an external SLC copyback operation, as opposed to the method of FIG. 2, which shows an internal SLC copyback operation. A first difference is that FIG. 4 includes writing to MLC program latches during SLC programming (e.g., within the single multi-phase command) and using this data in the MLC program latches directly for MLC programming during the first pass, avoiding the SLC read steps. A second difference is that the multi-phase command of FIG. 4 includes the programming of all pages of SLC and transfer to the MLC program latches but does not include MLC programming in the same multi-phase command, which is the case in FIG. 2. In the method of FIG. 4, MLC programming is excluded because data is transferred to the controller 102 for error correction before being written to the MLCs during the 2nd pass of programming (e.g., fine programming). Error correction is done in external SLC copyback operations to have a more accurate voltage distribution after the 2nd pass of MLC programming.

Figure 5:
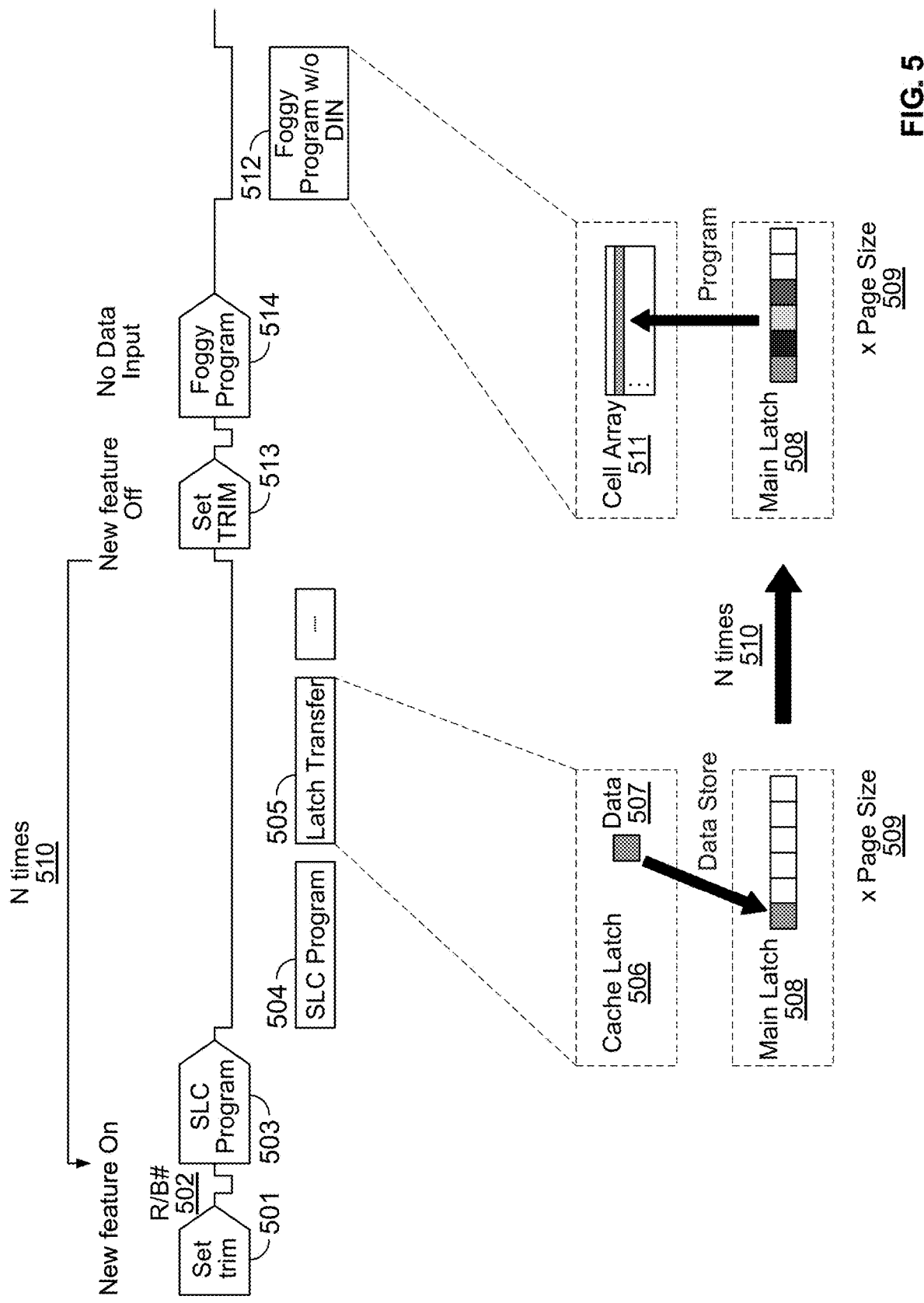
FIG. 5 shows a schematic representation of a first external SLC copyback operation, in accordance with some embodiments of the present disclosure.

FIG. 5 shows a schematic representation of an external SLC copyback operation, in accordance with some embodiments of the present disclosure. At step 501, the controller 102 sets the memory trim registers for the SLC copyback operation with a feature that stores data in the MLC program latches (e.g., the main latches) during the SLC program operation.

The R/B #output signal 502 is used to indicate the operating condition of the memory 103. In some embodiments, the R/B signal is in a busy state (i.e., R/B #=low) during the program, erase and read operations, and the R/B signal returns to a ready state (i.e., R/B #=high) after completion of the operation. At step 503, the controller 102 issues an SLC program command to the storage device 101.

At step 504, the memory controller 102 writes the new data 507 to a first page of SLCs and at step 505, additionally stores the new data 507 in the main latches 508. As may be needed when transferring multiple pages of data, the controller optionally repeats steps 503, 504 and 505 N times 510 for each of the remaining pages of data, where N again may correspond to the number of planes in the memory 103. During each latch transfer step 505, the memory controller 102 retrieves data 507 from a cache latch 506 and stores the data 507 in a main latch 508. Each block in cache latch 506 and main latch 508 may represent a page or a multi-plane page of data. The total amount data transferred may be roughly equal to the page size 509 (e.g., 4 kB, 8 kB, or 16 kB) of the memory 103 multiplied by the number of planes N 510 (e.g., 2, 4, or any other suitable number of planes) in the memory 103. The page size 509 and the number of planes N 510 may depend on the technology node, system configuration, any other suitable factor, or any combination thereof. In some embodiments, the controller 102 may operate on each one of the N planes in parallel (e.g., to increase throughput).

After the controller 102 repeats step N times 510 for each of the required pages of SLC, at step 513, the controller 102 provides the set trim command again with the feature that stores SLC data in the MLC program latches turned off. After the controller 102 resets the set Trim command, it issues an MLC program command 514 for the 1st pass (e.g., foggy programming) of MLC programming. This command does not require the reading of additional data from the SLCs, because at step 504, the data was already stored in the main latches 508. At step 512, the controller 102 performs the 1st pass of MLC programming on the MLCs in the cell array 511 in the memory 103 using the data that was stored in the main latches 508.

In some embodiments, a 2nd pass of programming (e.g., fine programming) occurs after the memory controller 102 completes the operations of command 514, where this second pass includes reading data from SLCs, transfer of data to the memory controller, error correction of the data, and programming the MLCs for a 2nd time with the error corrected data.

Figure 6:
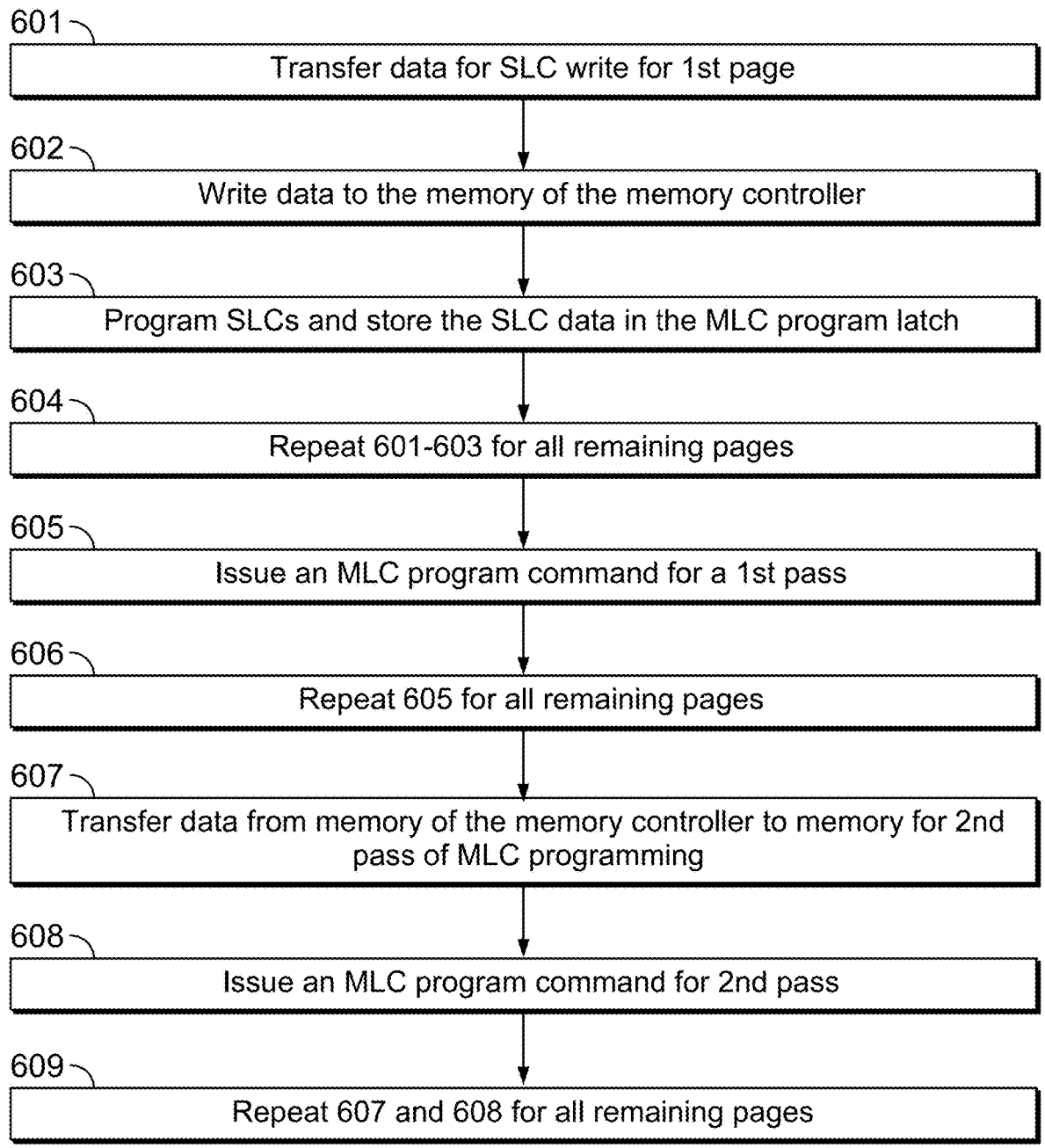
FIG. 6 shows an illustrative flowchart of a second external SLC copyback operation, in accordance with some embodiments of the present disclosure.

FIG. 6 shows an illustrative flowchart of steps of an external SLC copyback operation, in accordance with some embodiments of the present disclosure. In some embodiments, the host 104 performs a writing operation at the storage device 101. At step 601, the host 104 transfers data to memory 103 by sending a command to the memory controller 102 inside the storage device 101. At step 602, the memory controller 102 writes the data to the memory (e.g., DRAM) of the memory controller 102. At step 603, the memory controller 102 writes the new data to a first page of SLCs and additionally stores data in MLC program latches (i.e., the main latches). As is needed when transferring multiple pages of data, steps 601, 602 and 603 are optionally repeated at step 604 for each of the remaining pages of data. The total number of SLC pages that may be processed during programming of a corresponding MLC can depend on the number of bits per cell of the MLC.

At step 605, the controller 102 issues an MLC program command for the 1st pass (e.g., foggy programming) with the data stored in the MLC program latches. The process in step 605 is repeated for all remaining pages at step 606.

At step 607, the controller 102 sends data from the memory of the controller 102 to the MLC program latches for MLC programming. At step 608, the controller 102 issues an MLC program command for the 2nd pass (e.g., fine programming). Thus, these steps eliminate the need for error correction of data using ECCs (e.g., LDPC, BCH, or RS ECCs). At step 609, steps 607 and 608 are repeated for all the remaining pages.

This method shown in the FIG. 6 flowchart also shows an external SLC copyback operation, similar to FIG. 4. The difference in FIG. 6 is the writing data to the memory of the memory controller step, which bypasses the need for transferring data to the controller for error correction (e.g., LDPC) prior to MLC programming (e.g., during a 2nd or subsequent pass). Instead, during the 2nd or subsequent pass (e.g., fine programming), error-free data can be transferred from the memory of the memory controller 102 directly to the MLC program latches. In this approach, a single multi-phase command can cause SLC programming to occur, SLC data to transfer to MLC program latches, and MLC programming to occur. For multiple passes, a corresponding number of multiple multi-phase commands may be issued for improved efficiency with respect to power consumption and operational speed.

Figure 7:
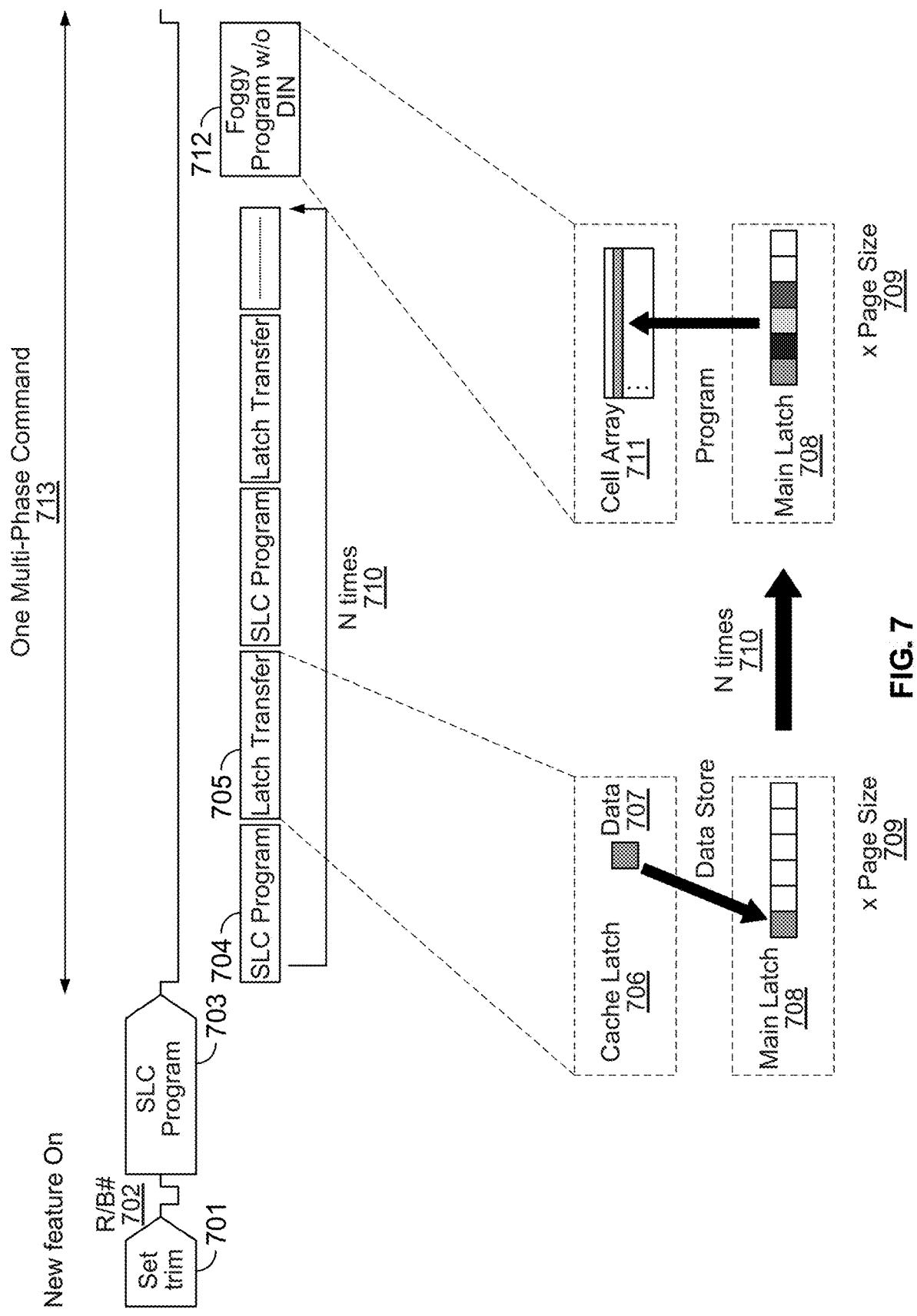
FIG. 7 shows a schematic representation of a second external SLC copyback operation, in accordance with some embodiments of the present disclosure.

FIG. 7 shows a schematic representation of an external SLC copyback operation, in accordance with some embodiments of the present disclosure. At step 701, the controller 102 provides the set trim command for the SLC copyback operation, including a feature that writes the data to the memory (e.g., DRAM) of the memory controller 102 in addition to storing the data in the MLC program latches (e.g., the main latches) during the SLC program operation. The R/B #output signal 702 is used to indicate the operating condition of the memory 103. In some embodiments, the R/B signal is in a busy state (i.e., R/B #=low) during the program, erase and read operations, and the R/B signal returns to a ready state (i.e., R/B #=high) after completion of the operation. At step 703, the controller 102 issues a single multi-phase command 713 to the storage device 101.

At step 704, the memory controller 102 writes the new data 707 to a first page of SLCs and at step 705, additionally stores data in the main latches 708. As is needed when transferring multiple pages of data, the controller 102 optionally repeats the steps 703, 704 and 705 N times 710 for each of the remaining pages of data. N corresponds to the number of planes in the memory 103. During each latch transfer step 705, the memory controller 102 retrieves data 707 from a cache latch 706 and stores the data 707 in a main latch 708. Each block in cache latch 706 and main latch 708 represent a page or a multi-plane page of data. The total amount data transferred may be roughly equal to the page size 709 (e.g., 4 kB, 8 KB, or 16 kB) of the memory 103 multiplied by the number of planes N 710 (e.g., 2, 4, or any other suitable number of planes) in the memory 103. The page size 709 and the number of planes N 710 may depend on the technology node, system configuration, any other suitable factor, or any combination thereof. In some embodiments, the controller 102 may operate on each one of the N planes in parallel (e.g., to increase throughput).

After the controller 102 repeats this step N times 710 for each of the required pages of SLC in the memory 103, at step 712, it performs the 1st pass of MLC programming on the MLCs in the cell array 711 in the memory 103 using the data that was stored in the main latches 708. There is no data input because the data has already been stored in the main latches 708.

In some embodiments, a 2nd pass of programming (e.g., fine programming) occurs after the memory controller 102 completes the operations of command 713. In the 2nd pass of MLC programming, the memory controller 102 transfers data directly from the memory of the memory controller 102 to the memory 103 for MLC programming. Thus, error correction of data using ECCs (e.g., LDPC, BCH, or RS ECCs) is eliminated.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method for writing data to a storage device comprising memory, the method comprising:
   receiving, at processing circuitry, an instruction from a host device to write the data to the storage device and, based on the receiving the instruction:
   writing the data to a plurality of single layer cells (SLCs), wherein each SLC is located in a first portion of the memory,
   executing, using the processing circuitry, a program to write the data written in the plurality of SLCs to a plurality of multi-level cells (MLCs) using a single program command comprising an address of each SLC in the first portion of the memory, wherein each MLC is located at a second portion of the memory and wherein executing the program comprises:
   reading from each SLC of the plurality of SLCs in the first portion of the memory respective SLC data, storing, in each of a plurality of latches, at least some of the respective single-layer cell (SLC) data that was read from the plurality of SLCs in the first portion of the memory, writing the SLC data that was stored in the plurality of latches to the plurality of MLCs in the second portion of the memory, and configuring the second portion of the memory by determining threshold voltage distributions associated with respective threshold voltages of the MLCs; and using the threshold voltage distributions to read respective data written in each MLC.

2. The method of claim 1, wherein the single program command further comprises at least one of a program erase count, a read level shift, or a temperature.

3. The method of claim 2, wherein the reading from each SLC of the plurality of SLCs comprises reading from each SLC of the plurality of SLCs based on the at least one of a program erase count, a read level shift, or a temperature.

4. The method of claim 1, wherein configuring the second portion of the memory comprises determining the threshold voltage distributions using multiple passes.

5. The method of claim 4, wherein, on each pass of the multiple passes, one or more of the threshold voltage distributions is made narrower.

6. The method of claim 1, wherein the writing of the SLC data that was stored in the plurality of latches to the plurality of MLCs in the second portion of the memory further comprises performing an error correction based on a low-density parity check.

7. The method of claim 1, further comprising, before the reading from each SLC of the plurality of SLCs, writing the data to memory of a memory controller, wherein the memory of the memory controller is separate from the memory of the storage device.

8. The method of claim 7, further comprising:
sending the data written to the memory of the memory controller to the plurality of latches.

9. A memory storage device comprising:
memory; and
processing circuitry coupled to the memory, the processing circuitry to:
receive an instruction from a host device to write data to the memory storage device and, based on the receiving the instruction:
causing the data to be written in a plurality of single-level cells (SLCs), wherein each SLC is located in a first portion of the memory, and
execute a program to write data written in the plurality of SLCs to a plurality of multi-level cells (MLCs) using a single program command comprising an address of each SLC in the first portion of the memory, wherein each MLC is located at a second portion of the memory and wherein to execute the program comprises:
causing respective SLC data to be read from each SLC of the plurality of SLCs in the first portion of the memory,
causing at least some of the respective SLC data that was read from the plurality of SLCs in the first portion of the memory to be stored in each of a plurality of latches,
writing the SLC data that was stored in the plurality of latches to the plurality of MLCs in the second portion of the memory, and
configuring the second portion of the memory by determining threshold voltage distributions associated with respective threshold voltages of the MLCs; and
cause respective data written in each MLC to be read using the threshold voltage distributions.

10. The memory storage device of claim 9, wherein the single program command further comprises at least one of a program erase count, a read level shift, or a temperature.

11. The memory storage device of claim 10, wherein the processing circuitry is further to read from each SLC of the plurality of SLCs based on the at least one of a program erase count, a read level shift, or a temperature.

12. The memory storage device of claim 11, wherein the processing circuitry is further to use the threshold voltage distributions to read respective data stored in each MLC.

13. The memory storage device of claim 9, wherein the processing circuitry is further to configure the second portion of the memory by determining the threshold voltage distributions using multiple passes.

14. The memory storage device of claim 13, wherein the processing circuitry is further to configure the threshold voltage distributions such that on each pass of the multiple passes, one or more of the threshold voltage distributions is made narrower.

15. The memory storage device of claim 9, wherein the processing circuitry is further to perform an error correction based on a low-density parity check when writing the SLC data that was stored in the plurality of latches to the plurality of MLCs in the second portion of the memory.

16. The memory storage device of claim 9, wherein the processing circuitry is further to:
write the data to memory of a memory controller, wherein the memory of the memory controller is separate from the memory of the storage device; and
send the data written to the memory of the memory controller to the plurality of latches.

17. A method for writing data to a storage device comprising memory, the method comprising:
receiving, at processing circuitry, an instruction from a host device to write the data to the storage device and, based on the receiving the instruction:
writing the data to a plurality of single-level cells (SLCs), wherein each SLC is located in a first portion of the memory,
reading from each SLC of the plurality of SLCs in the first portion of the memory respective SLC data,
storing, in each of a plurality of latches, at least some of the respective SLC data that was read from the plurality of SLCs in the first portion of the memory, and
executing, using the processing circuitry, a program to write the SLC data stored in the plurality of latches to a plurality of multi-level cells (MLCs) using a single program command comprising an address of each SLC in the first portion of the memory, wherein each MLC is located at a second portion of the memory and wherein executing the program comprises:
writing the SLC data that was stored in the plurality of latches to the plurality of MLCs in the second portion of the memory, and
configuring the second portion of the memory by determining threshold voltage distributions associated with respective threshold voltages of the MLCs; and using the threshold voltage distributions to read respective data written in each MLC.

18. The method of claim 17, wherein the writing of the SLC data that was stored in the plurality of latches to the plurality of MLCs in the second portion of the memory further comprises performing an error correction based on a low-density parity check.

19. The method of claim 17, further comprising, before the reading from each SLC of the plurality of SLCs, writing the data to memory of a memory controller, wherein the memory of the memory controller is separate from the memory of the storage device.

20. The method of claim 19, further comprising:
sending the data written to the memory of the memory controller to the plurality of latches.

* * * * *